J. C. MILHOLLAND, DEC'D.
S. F. MILHOLLAND, ADMINISTRATRIX.
SAW SET.
APPLICATION FILED AUG. 7, 1909.
980,877.
Patented Jan. 3, 1911.
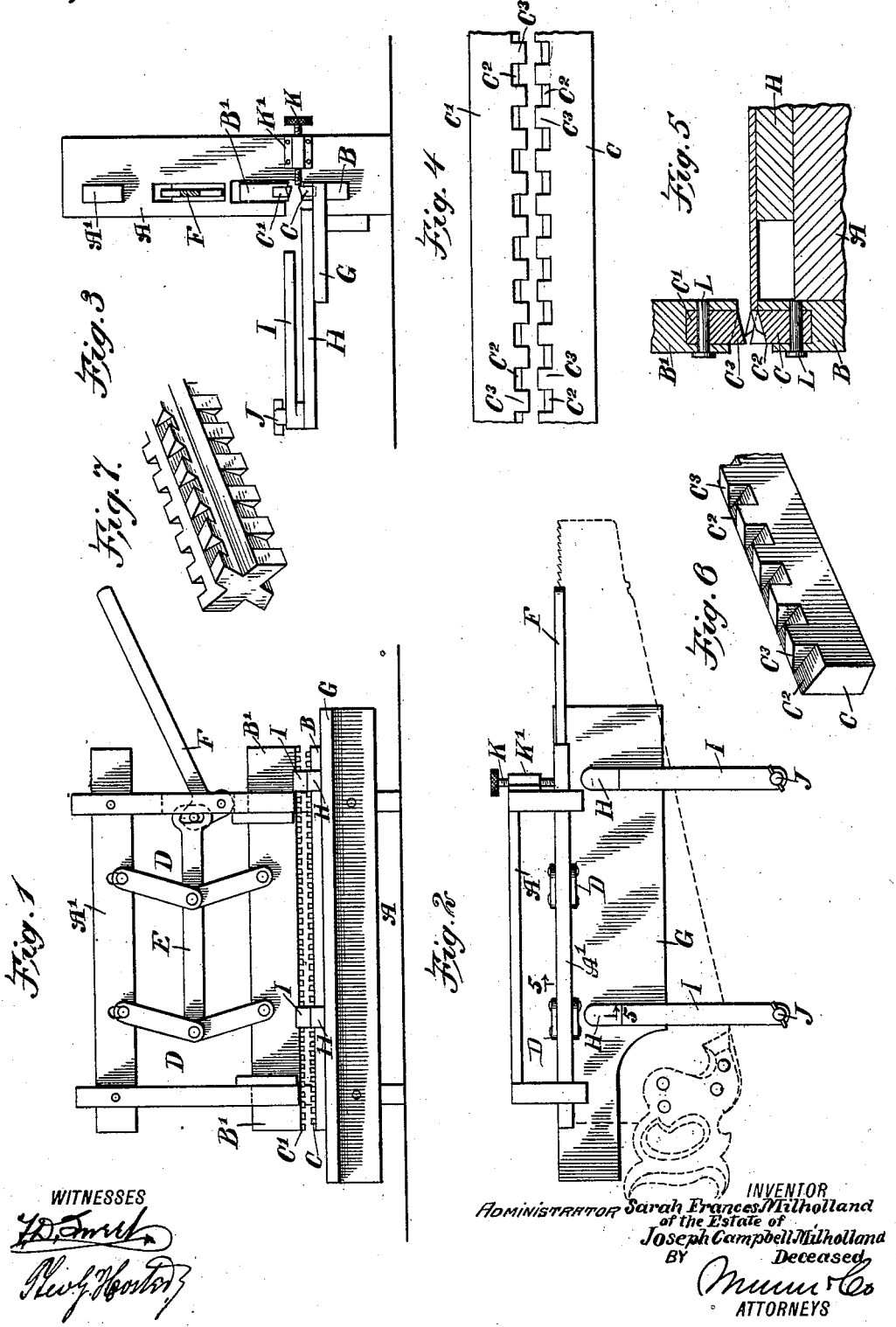
WITNESSES
INVENTOR
ADMINISTRATOR Sarah Frances Milholland
of the Estate of
Joseph Campbell Milholland
BY Deceased
ATTORNEYS

UNITED STATES PATENT OFFICE.

JOSEPH C. MILHOLLAND, DECEASED, LATE OF OKLAHOMA, OKLAHOMA; SARAH FRANCES MILHOLLAND, OF OKLAHOMA, OKLAHOMA, ADMINISTRATRIX, ASSIGNOR OF ONE-THIRD TO GEORGE BENSON MILHOLLAND, OF ORONOGO, MISSOURI.

SAW-SET.

980,877.     Specification of Letters Patent.      Patented Jan. 3, 1911.

Application filed August 7, 1909. Serial No. 511,811.

*To all whom it may concern:*

Be it known that I, SARAH FRANCES MILHOLLAND, a citizen of the United States, and a resident of Oklahoma city, in the county and State of Oklahoma, administratrix of the estate of JOSEPH CAMPBELL MILHOLLAND, deceased, late a citizen of the United States, and a resident of Oklahoma, in the county and State of Oklahoma, who did in his lifetime invent certain new and useful Improvements in Saw-Sets, do hereby declare the following to be a full, clear, and exact specification of said invention.

The object of the invention is to provide a new and improved saw-set, arranged to accurately and quickly set a plurality of teeth at the same time, successive teeth standing in opposite directions.

The invention consists of novel features and parts and combinations of the same, which will be more fully described hereinafter and then pointed out in the claim.

A practical embodiment of the invention is represented in the accompanying drawings forming a part of this specification, in which similar characters of reference indicate corresponding parts in all the views.

Figure 1 is a side elevation of the improvement; Fig. 2 is a plan view of the same; Fig. 3 is an end elevation of the same; Fig. 4 is an enlarged face view of the dies; Fig. 5 is an enlarged cross section of the improvement on the line 5—5 of Fig. 2; Fig. 6 is a perspective view of one of the dies; and Fig. 7 is a perspective view of a modification of a die provided with a plurality of sets of anvils and heads.

The saw-set is mounted on a suitably constructed main frame A, supporting a fixed jaw B, in which is removably secured a die C, operating in conjunction with a movable die C' for setting the teeth of the saw, as hereinafter more fully described. The dies C and C' are provided with alternating anvils C² and heads C³, of which the heads C³ of one die are opposite the anvils C² of the other die, and the anvils and heads are beveled in opposite directions, as will be readily understood by reference to Figs. 5 and 6. The die C' is removably held in a jaw B', mounted to slide up and down in suitable bearings on the frame A, and the said jaw B' is connected with toggle levers D, pivotally connected with a supporting bar A' forming part of the frame A. The toggle levers D are pivotally connected with a link E, engaged by a hand lever F, fulcrumed on the frame A and under the control of the operator, to cause the toggle levers to open and close with a view to move the jaw B' up and down for the die C' to co-act with the die C to set the teeth of the saw. On the frame A is secured a table G, extending in front of the fixed jaw B and its die C, and on the table are secured the transversely-extending supporting bars H for the saw to rest on, the top of the bars H being approximately flush with the top of the die C, as plainly shown in Figs. 3 and 5, to bring the teeth of the saw in proper position on the top of the die C. Retaining bars I are secured at the outer ends to the outer ends of the bars H by thumb screws J, to engage the top of the saw and thus hold the same against accidental shifting while the saw teeth are set. A transverse screw K, located immediately in the rear of the die C, screws in a nut K' attached to the frame A, so as to regulate the depth the saw teeth extend on top of the die C.

Pins L or other fastening devices are used for securing the dies C, C' in place in the jaws B, B', to allow of conveniently removing the dies C, C' for exchanging the same for dies used for setting saw teeth of different saws.

The operation is as follows: When the jaw B' is in raised position, the saw is placed in position between the bars H, I, with the saw teeth extending alternately over the anvils C² and heads C³ of the fixed die C, it being understood that the number of teeth per inch in the saw correspond to the number of anvils C² and heads C³ per inch of the die C or C'. The operator now bears down on the lever F, to straighten out the toggle levers D and thus move the die C' down and in engagement with the top of the saw teeth, thus setting the same alternately in opposite directions, as each head C³ of one die co-acts with the anvil C² of the other die. After the teeth are set, the lever F is returned to raise the die C' out of contact with the saw teeth.

By the arrangement described a large number of saw teeth are set simultaneously with the greatest accuracy, and if the length of the saw exceeds the length of the dies, the saw is shifted correspondingly over the support, to engage another set of teeth with the die C, after which the above described operation is repeated, that is, the die C' is brought down to set the teeth.

Having thus described my invention, I claim as new and desire to secure by Letters Patent:

In a saw-set, the combination of a fixed jaw and a movable jaw, dies on the said jaws, provided with alternately upwardly and downwardly inclined anvils and heads having plane surfaces and extending transversely the entire width of the dies, with an edge of each of the said anvils and an edge of each of the said heads constituting a straight edge on the said dies, pairs of toggle levers comprising toggle bars pivoted at their ends to a horizontal bar centrally disposed, with one pair of the toggle levers pivotally connected with one of the dies and a hand lever pivotally mounted to the frame of the saw-set and having a pin eccentrically mounted and engaging a slot of the said horizontal bar, and a holder on the said fixed jaw for removably holding a saw, the teeth on the said saw being adapted to rest on the anvils and heads of the said fixed jaw and to be set by the said anvils and heads of the movable jaw co-acting with the said anvils and heads on the fixed jaw.

In testimony whereof I have signed my name to this specification in the presence of two subscribing witnesses.

SARAH FRANCES MILHOLLAND,
*Administratrix of the estate of Joseph C. Milholland, deceased.*

Witnesses:
E. L. B. HALL,
J. H. READY.